(No Model.)
E. COLEMAN.
ORE FEEDER FOR STAMP BATTERIES.
No. 247,615. Patented Sept. 27, 1881.
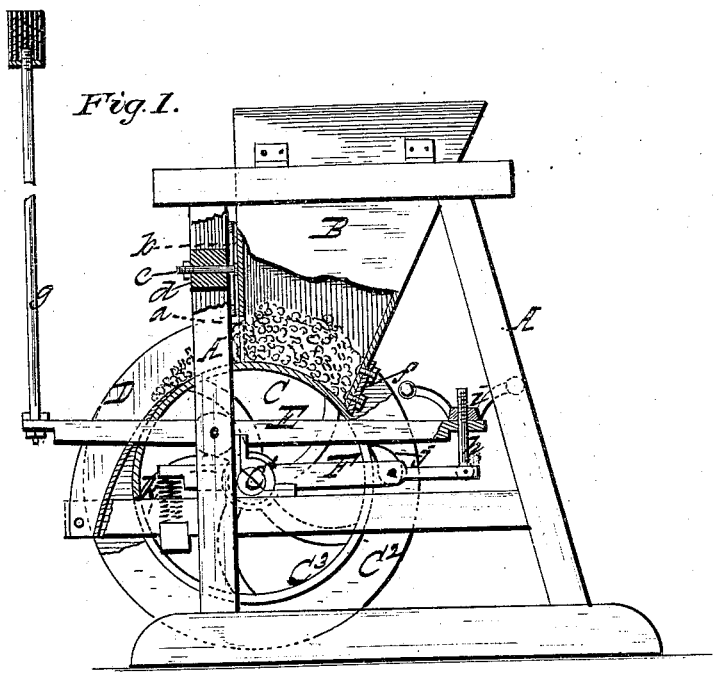
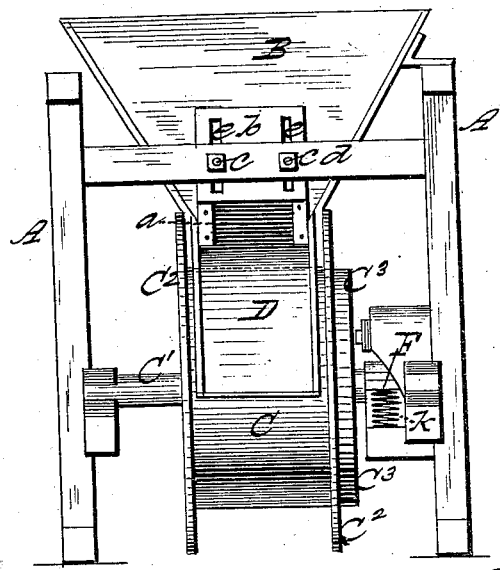
WITNESSES
INVENTOR

UNITED STATES PATENT OFFICE.

EZRA COLEMAN, OF NEW YORK, N. Y.

ORE-FEEDER FOR STAMP-BATTERIES.

SPECIFICATION forming part of Letters Patent No. 247,615, dated September 27, 1881.

Application filed October 8, 1880. (No model.)

To all whom it may concern:

Be it known that I, EZRA COLEMAN, a citizen of the United States, residing at New York, in the county of New York and State of New York, have invented certain new and useful Improvements in Ore-Feeders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1 is a side elevation, partly in section, of my improved ore-feeder; and Fig. 2 is a front view of the same.

This invention appertains to improvements in ore-feeders specially applicable to stamp-batteries, and of that class employing a vertically-rotary feeder or cylinder combined with a stationary hopper.

My improvement combines with the aforesaid elements mechanism substantially as hereinafter described, whereby the contents of the hopper are fed into the discharge-chute or upon the table, conducting the material to the battery or other point in the required and uniform quantities.

Referring to the accompanying drawings, A indicates an upright frame of suitable construction to support the parts of my improved feeder or machine. B is a hopper, supported upon or within the frame A, with its lower end adapted to conform to and almost touch the periphery of the feeding-cylinder.

At the front of the hopper is the feed-opening $a$. Its size may be regulated by means of a slide or gate, $b$, adjusted at that side of the hopper and above the opening upon set-screws or rods $c$, passing through a cross-piece, $d$, of the frame A, and through elongated slots $e$ in the slide or gate, and headed upon the inside of the slide, as clearly shown in Fig. 1 and partially in Fig. 2.

At the rear side of the hopper is a vertically-adjustable plate, $f$, to prevent the escape of fine material or particles that may pass between the lower rear end of the hopper and the cylinder.

C is the vertically-rotary cylinder, hung upon an axis or shaft, C', suitably journaled within the frame A. This cylinder, whose periphery is in near contiguity with the lower end of the hopper, has circular flanges $C^2$ at its heads or ends, which prevent the lateral escape of fine particles from the hopper and conduct any that may possibly escape down under the machine.

Extending down, preferably nearly in the same curvature with the forward side of the cylinder, is the discharge-chute D, which may be secured in position to the frame A as shown, or in other suitable manner, with its upper edge touching the periphery of the cylinder tangentially to serve also as a scraper, and thus keep the periphery of the cylinder clean. The cylinder C has also a supplemental periphery or a third circular flange, $C^3$, extending from one side thereof, the function of which will presently be seen.

E is a horizontal lever, fulcrumed upon one of the uprights of frame A, with the elastic cushioned tappet-rod $g$ secured upon its shorter arm. The tappet of the stamp-rod of the battery strikes the elastic cushioned head of the rod $g$, and thus imparts motion to the feeder. The longer arm of this lever is adjustably connected to the arm of a second lever, F, by screw rod or arm $h$, pivoted to the latter lever and extending up through the former lever, and having a set-nut, $i$, thereon. This adjustment permits of the regulating of the height of the lever E and the rod $g$ with relation to the stamp-rod as it wears away, to preserve the uniformity of the force of its striking action upon the rod $g$ and lever E, and accordingly affect the action of the cam or eccentric acting upon and imparting an intermittent rotary motion to the cylinder or feeder.

The lever F is fulcrumed or slipped upon the axis or shaft of the cylinder C, carries the cam or eccentric $j$, hung upon its inside and impinging upon the supplemental periphery or flange $C^3$ of the said cylinder, and is connected to a spring, $k$, secured to a projection of the frame A. The action of this spring is twofold, its compression as the rod $g$ is struck causing the cam or eccentric $j$ to impinge firmly against the flange $C^3$ as the lever F is thus carried up at its rear end, and give the feeder or cylinder a partial rotation, while its distention as that end of the lever F falls or descends keeps the cam or eccentric in frictional contact with the cylinder when the cam has reached its lowest point, holding it in position to again bite and give the cylinder another partial rotation when the rod g and levers E and F are acted upon, as above set forth. This also precludes the cylinder having a rearward or reverse motion.

Among other ways, the seat for receiving the wedge and roll, with the roll interposed between the wedge and the inside of the seat, may be formed by giving the outer end of the lever an L shape, the return portion, with the body of the L, inclosing and forming a bearing for the axis of the roll and the wedge.

Having thus fully described my invention, I claim and desire to secure by Letters Patent—

1. In an ore feeder, the combination, with the vertical rotary cylinder or feeder C, above which is arranged the hopper B, and having the supplemental periphery C³, of the lever F, having the cam or eccentric j, bearing against the said supplemental periphery C³ of the feeder C, and having the spring k, connected to the frame A, and lever E, connected to lever F, and having the tappet-rod, substantially as and for the purpose set forth.

2. In an ore-feeder, the combination, with the lever E, connected to the tappet-rod g, of the lever F, connected by a spring, k, to the frame A, provided with the cam or eccentric j, bearing against the cylinder C, and the pivoted screw-rod or pivot h, having an adjusting-nut, i, as set forth.

In testimony whereof I affix my signature in presence of two witnesses.

EZRA COLEMAN.

Witnesses:
JAS. H. LANGE,
J. WM. MISTER.